(12) United States Patent
Wilson et al.

(10) Patent No.: US 9,669,332 B2
(45) Date of Patent: Jun. 6, 2017

(54) DEFOAMING COMPOSITIONS COMPRISING HYDROXY TERMINATED SILOXANES AND METHODS OF MAKING AND USING THE SAME

(71) Applicant: Kemira Oyj, Helsinki (FI)

(72) Inventors: Robert Wilson, Marietta, GA (US); Luciana Bava, Dunwoody, GA (US); Carter Kirwan, Atlanta, GA (US)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 14/982,024

(22) Filed: Dec. 29, 2015

(65) Prior Publication Data

US 2016/0184740 A1 Jun. 30, 2016

Related U.S. Application Data

(60) Provisional application No. 62/098,046, filed on Dec. 30, 2014.

(51) Int. Cl.
*B01D 19/04* (2006.01)
*D21C 3/28* (2006.01)
*D21H 21/12* (2006.01)

(52) U.S. Cl.
CPC .......... *B01D 19/0409* (2013.01); *D21C 3/28* (2013.01); *D21H 21/12* (2013.01)

(58) Field of Classification Search
CPC ........................... B01D 19/04; B01D 19/0409
USPC .................................................. 516/115–117
See application file for complete search history.

(56) References Cited

U.S. PATENT DOCUMENTS

| 4,639,489 A * | 1/1987 | Aizawa .............. B01D 19/0409 516/123 |
| 5,152,925 A | 10/1992 | Furman |
| 5,916,090 A * | 6/1999 | Itagaki ............... B01D 19/0409 516/117 |
| 2003/0134093 A1* | 7/2003 | Kitamura ............. B41M 5/5227 428/195.1 |
| 2014/0364515 A1* | 12/2014 | Zeng .................. B01D 19/0409 516/55 |

FOREIGN PATENT DOCUMENTS

| EP | 0887383 A2 | 12/1998 |
| EP | 2508237 A2 | 10/2012 |

OTHER PUBLICATIONS machine translation of JP 57-156008.*
abstract for KR 2006028228.*
Höfer, Rainer et al., "Foams and Foam Control", Ullmann's Encyclopedia of Industrial Chemistry, 2000, Wiley-VCH, Weinheim.
IUPAC, Compendium of Chemical Terminology: Gold Book, Version 2.3.3, Feb. 24, 2014.
Schwartz, Anthony M. et al., "Surface active agents: Their chemistry and technology", vol. I (1949), pp. 414-423, Interscience Publishers, Inc., New York.
Schwartz, Anthony M. et al., "Surface active agents and detergents", vol. II (1958), pp. 664-669, Interscience Publishers, Inc., New York.
International search report of PCT/FI2015/050953 issued by European Patent Office on Apr. 18, 2016.

* cited by examiner

*Primary Examiner* — Marc Zimmer
(74) *Attorney, Agent, or Firm* — Berggren Inc.

(57) ABSTRACT

Disclosed herein are methods of defoaming industrial process streams, the methods comprising adding to the industrial process stream an emulsion comprising silicone emulsion droplets in a continuous aqueous phase. Also disclosed herein are defoamer compositions comprising these silicone emulsions and methods of making such compositions.

14 Claims, 3 Drawing Sheets

DEFOAMING COMPOSITIONS COMPRISING HYDROXY TERMINATED SILOXANES AND METHODS OF MAKING AND USING THE SAME

PRIORITY

This application claims priority of U.S. provisional application No. 62/098,046 filed on Dec. 30, 2014, the contents of which is incorporated herein by reference in its entirety.

FIELD OF THE INVENTION

The present invention relates to the use of hydroxyl terminated siloxanes to make silicone emulsion defoaming compositions, and to methods of making and using defoaming compositions that contain such siloxanes.

BACKGROUND

Foaming is a common problem in many industrial processes, particularly in paper making operations where foam can prevent proper formation of the finished paper and disrupt manufacturing operations. Defoamers, sometimes called anti-foaming agents, can be added to process streams to combat this problem. Commonly used agents are insoluble oils, polydimethylsiloxanes and other silicones, certain alcohols, stearates and glycols. The defoamer can be added either to prevent formation of foam or to break a foam already formed. (Rainer Höfer et al., "Foams and Foam Control," Ullmann's Encyclopedia of Industrial Chemistry, 2000, Wiley-VCH, Weinheim).

Experiments with silicone-based defoamers started during the 1950s. These were based on polydimethylsiloxane (silicone oil) dispersed in water or light oil. Silicone oils worked well, but caused surface disturbances in many applications like paints and papermaking. In 1963, the first defoamers made with hydrophobic silica particles in light oil were patented, including dispersions of solid particles in silicone oil (so-called "filled silicone"). These eventually were replaced by water-based defoamers, and today the predominant defoamers in the paper-making industry use filled silicone present as a silicone-in-water emulsion. The silicon itself is typically a dispersion of solid particles in one or more silicone fluids. This dispersion can employed as is, without further modification, mixed with other silicone oils, or emulsified in water, for defoaming or preventing foaming in liquid media.

These prior art silicone-in-water emulsions are commonly prepared by mixing silica in a methyl-terminated low viscosity siloxane at temperatures ranging from 140° C.-160° C. for a few hours before cooling. This mixture can later be homogenized under high shear to break apart the silica agglomerates to an evenly dispersed target particle size. A promoter can be added to promote the hydrophobization of any hydrophilic sites on the silica exposed during the homogenization process. Additional silicones can be added before or after the silica is dispersed and homogenized, typically of much higher viscosity, to increase the defoaming performance and longevity of the composition.

The manufacture of silicone-based defoamers is a time and heat intensive process, primarily because of the need to melt and mix the defoamer ingredients before forming an emulsion, and the sheer force required to homogenize silica in the silicone at a desired uniform particle size. What is needed are improved techniques and compositions for manufacturing silicone emulsion defoamer compositions that require less time and use less energy for production. Ideally, the resulting emulsion would have improved antifoaming activity, improved finished product performance, and improved activity in the process stream to which it is added.

SUMMARY OF THE INVENTION

It has surprisingly been discovered that hydroxyl terminated siloxanes having substantially the same neat viscosity as methyl terminated siloxanes behave very differently rheologically when mixed with silica particles of the same size and composition to make filled silicones. These hydroxyl-terminated siloxanes reduce the time and energy required to make the filled silicone and the final emulsion, and ultimately improve the defoaming performance of the emulsion even without adding complex silicone concentrates. In particular, it has been found experimentally that a 20% dispersion of silica in the methyl terminated siloxane of the prior art has a viscosity at 90° C. of 4000 cP, while the viscosity of a 20% dispersion of silica in hydroxyl-terminated siloxane at 90° C. has a viscosity of only 300 cP, even though the neat viscosity of the methyl-terminated and hydroxyl-terminated siloxanes are the same at 100 cst. The lower viscosity of the filled silicon makes the addition rate of the silica significantly faster and easier with benefits in processing time and energy requirements.

Therefore, in a first principal embodiment the invention provides a method of making a silicone in water emulsion defoamer composition comprising (a) providing a silicone phase comprising a filled silicone made by (i) providing from about 75 weight parts to about 90 weight parts of a linear hydroxyl-terminated siloxane having a neat viscosity at 25° C. of from about 10 cst to about 3000 cst, typically from about 75 cst to about 3000 cst; and (ii) dispersing from about 10 weight parts to about 25 weight parts of silica in said siloxane to make a filled silicone; (b) providing an aqueous phase; (c) emulsifying said silicone phase in said aqueous phase to form said silicone in water emulsion defoamer composition.

It has further been discovered the filled silicones of the present invention using the hydroxyl-terminated siloxanes perform equally well or better than commercially marketed methyl-terminated siloxane defoamers, even those defoamers that incorporate expensive and complex silicone chemistries. Therefore, in a second principal embodiment the invention provides a method of defoaming or preventing foam in an industrial process stream comprising adding to said industrial process stream an emulsion comprising silicone droplets in an aqueous phase, wherein (a) said silicone droplets comprise filled silicone comprising a silica in silanol dispersion; and (b) said filled silicone comprises silica to silanol at a weight ratio of from about 10:90 to about 25:75.

A third principal embodiment relates to the defoamer compositions themselves, and in this embodiment the invention provides a defoamer composition comprising silicone droplets emulsified in an aqueous phase, wherein (a) said silicone droplets comprise a filled silicone; (b) said filled silicone comprises from about 75 weight parts to about 90 weight parts of a silanol and from about 10 weight parts to about 25 weight parts of silica dispersed in said silanol; and (c) said silanol is a linear hydroxyl-terminated siloxane having a neat viscosity at 25° C. of from about 10 cst to about 3000 cst, typically from about 75 cst to about 3000 cst.

Additional advantages of the invention are set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Definitions and Use of Terms

When the singular forms "a," "an," and "the" or like terms are used herein, they will be understood to include plural referents unless the context clearly dictates otherwise. Thus, for example, reference to "a hydrocarbon" includes mixtures of two or more such hydrocarbons, and the like. The word "or" or like terms as used herein means any one member of a particular list and also includes any combination of members of that list.

Ratios, quantities and rates of liquid flows expressed herein, unless otherwise specified, are expressed in terms of volume, and are preferably measured at room temperature (25° C.) and atmospheric pressure.

Throughout the description and claims, whenever a specific value is given it will be understood that the value includes values approximating the recited value, as if the value were modified by the term "about." In like manner, when the term "about" is used to refer to a specific value, the disclosure will be understood to include reference to the specific value without modification by the term about.

Throughout the description and claims of this specification, the word "comprise" and variations of the word, such as "comprising" and "comprises," means "including but not limited to," and is not intended to exclude, for example, other additives, components, integers or steps.

When ranges are given by specifying the lower end of a range separately from the upper end of the range, it will be understood that the range can be defined by selectively combining any one of the lower end variables with any one of the upper end variables that is mathematically possible.

The term "siloxane" refers to an organosilicone compound with the Si—O—Si linkage. The parent siloxanes include the oligomeric and polymeric hydrides with the formulae $H(OSiH_2)_nOH$ and $(OSiH_2)_n$. Siloxanes include linear, cyclic and branched compounds, the defining feature being that each pair of silicone centers is separated by one oxygen atom. The siloxane functional group forms the backbone of silicones, the premier example of which is polydimethylsiloxane, having the following structure:

wherein n typically ranges anywhere between 10 and 50,000. The length of the chain is not typically reported, however, because of the distribution of chain lengths in a particular mixture, and because manufacturers prefer to report and use viscosity to compare the siloxanes and control their manufacture.

An alternative siloxane used in the present invention is referred to as "silanol," also referred to herein as "hydroxyl-terminated siloxane." Silanol is a siloxane end-capped by a single hydroxyl moiety rather than methyl, and is preferably a polydimethylsiloxane end-capped by hydroxyl. The siloxane can also comprise a backbone of the chemical formula $—[R_2SiO]_n—$, where R is an organic group such as methyl, ethyl, or phenyl. In some cases, organic side groups can be used to link two or more of these —Si—O— backbones together. By varying the —Si—O— chain lengths, side groups, and cross-linking, silicones can be synthesized with a wide variety of properties and compositions.

The invention is defined in terms of principal embodiments. When an embodiment or subembodiment other than the principal embodiment is discussed herein, it will be understood that the embodiment or subembodiment can be applied to further limit any of the principal embodiments or subembodiments or other embodiments, in any feasible combination of features.

Discussion

In a first principal embodiment the invention provides a method of making a silicone in water emulsion defoamer composition comprising (a) providing a silicone phase comprising a filled silicone made by (i) providing from about 75 weight parts to about 90 weight parts of a linear hydroxyl terminated siloxane, in an embodiment dimethylsiloxane silanol, having a neat viscosity at 25° C. of from about 10 cst to about 3000 cst, typically from about 75 cst to about 3000 cst; and (ii) dispersing from about 10 weight parts to about 25 weight parts of silica in said siloxane to make a filled silicone; (b) providing an aqueous phase; (c) emulsifying said silicone phase in said aqueous phase to form said silicone in water emulsion defoamer composition. In one embodiment, in-process homogenization is employed during the dispersing step, typically by heating the silanol, i.e hydroxyl terminated siloxane, and applying adequate shear to the silanol/silica dispersion to homogenize the silica to a uniform particle size. In this embodiment, the method is optionally performed by heating the silanol to a temperature adequate to facilitate said dispersion of said silica in said silanol, and to treat any exposed hydrophilic groups on said silica (typically from 80° C. to 160° C.), and homogenizing the silica in the silanol.

In a second principal embodiment the invention provides a method of defoaming or preventing foam in an industrial process stream comprising adding to said industrial process stream an emulsion comprising silicone droplets in an aqueous phase, wherein (a) said silicone droplets comprise filled silicone comprising a silica in silanol dispersion; and (b) said filled silicone comprises silica to silanol at a weight ratio of from about 10:90 to about 25:75. Exemplary process streams to which the defoamer compositions can be added include pulp manufacturing streams, paper manufacturing streams, textile manufacturing streams, and cement manufacturing streams.

A third principal embodiment relates to the defoamer compositions themselves, and in this embodiment the invention provides a defoamer composition comprising silicone droplets emulsified in an aqueous phase, wherein (a) said silicone droplets comprise a filled silicone; (b) said filled silicone comprises from about 75 weight parts to about 90 weight parts of a silanol and from about 10 weight parts to about 25 weight parts of silica dispersed in said silanol; and (c) said silanol is a linear hydroxyl terminated siloxane, in an embodiment dimethylsiloxane, having a neat viscosity at 25° C. of from about 10 cst to about 3000 cst, typically from about 75 cst to about 3000 cst.

Silicone Emulsion Droplets in a Continuous Aqueous Phase

The emulsions of the present invention comprise silicone emulsion droplets in a continuous aqueous phase. The term "emulsion" refers to a combination of at least two liquids, where one of the liquids is present in the form of droplets in the other liquid. See, IUPAC, *Compendium of Chemical Terminology: IUPAC Recommendations,* 2d ed., compiled by A. D. McNaught and A. Wilkinson, Blackwell, Oxford (1997).

The emulsion can be defined by its viscosity, and in various embodiments the emulsion has a viscosity at 25° C. of from about 250, 500, 750, or 1,000 cst to about 14,000, 12,000, 10,000, 8,000, 6,000, 4,000 or 2,000 cst. In some embodiments, the emulsion has a viscosity at 25° C. of from about 250 cst to about 14,000 cst, from about 500 to about 3,000 cst, from about 500 to about 2,000 cst, or from about 500 to about 6,000 cst.

The emulsion can comprise water and silicone emulsion droplets in any weight ratio that facilitates defoaming. The water and silicone emulsion droplets are usually provided in a weight ratio (silicone:water) of greater than about 1:10, 1:8, 1:7, 1:6 or 1:5, and less than about 1:2, 1:3, or 1:4. The silicone:water weight ratio in various embodiments ranges from about 1:10 to 1:1, from about 1:7 to about 1:2, or from about 1:6 to about 1:3.

The filled silicone includes a dispersion of treated silica (hydrophobic) in silanol, commonly referred to as "filled silicone," in the emulsion droplets. The silanol in certain embodiments has a neat viscosity of from about 10 or 75 or 100 to about 6,000, 3,000, 1,000, 500 or 300 cst, preferably from about 10 or 75 or 100 cst to about 1000 or 500 cst (e.g. 10-3000 cst, 75-3000 cst, 75-1000 cst, 75-500 cst, or 100-500 cst). The filled silicone typically comprises from about 75 weight parts to about 90 weight parts of the silanol and from about 10 weight parts to about 25 weight parts of silica. Alternatively, the filled silicone can comprise from about 80 weight parts to about 90 weight parts of the silanol and from about 10 weight parts to about 20 weight parts of silica, or from about 75 weight parts to about 85 weight parts of the silanol and from about 15 weight parts to about 25 weight parts of silica.

The filled silicone will usually have a viscosity of from about 500 cP to about 10,000 cP at 25° C., and most often will have a viscosity of from about 750 cP to about 5,000 cP at 25° C. The treated silica in the filled silicone is preferably hydrophobic, and in various embodiments has an average particle size of from about 1 to about 30 microns, from about 5 to about 15 microns, or about 10 microns. The emulsion will typically comprise from about 0.5 to about 10 weight percent of said filled silicone, and in one embodiment comprises from about 1 to about 3 weight percent of said filled silicone.

Although not essential to the present invention, silicone emulsions can also use high viscosity siloxanes, in addition to the filled silicone, to create the emulsion droplets. These high viscosity siloxanes are commonly added to improve the stability of the emulsion and to lengthen the activity of the defoamer when added to an industrial process stream. The high viscosity silicone can be any linear or branched dialkylsiloxane end-capped by alkyl, but is preferably a linear dimethylsiloxane end capped by methyl having a viscosity of from about 10,000 cst to about 100,000 cst. In various embodiments, the high viscosity silicone has a viscosity at 25° C. of greater than about 5,000, 10,000, 15,000, 20,000, or 25,000 cst. As an upper bound, the high viscosity silicone will typically have a viscosity at 25° C. of less than about 100,000, 75,000, 50,000, or 40,000 cst. In some embodiments, the high viscosity silicone has a viscosity at 25° C. of from about 20,000 cst to about 40,000 cst (including about 20,000 cst to about 30,000 cst, about 25,000 cst to about 35,000 cst, or about 30,000 cst to about 40,000 cst).

When a high viscosity silicone is present, the emulsion will usually comprise filled silicone and high viscosity silicone in a weight ratio (high viscosity silicone:filled silicone) ranging from about 1:5, 1:3, 1:2 or 1:1 to about 10:1, 5:1 or 2:1 (e.g. 1:5-10:1, 1:2-10:1, 1:2-2:1, 1:1-10:1, 1:2-5:1, or 1:1-5:1). The viscosity of the mixture of high viscosity siloxane and filled silicone at 25° C. will typically exceed 4,000, 10,000, or 20,000 cP, and will typically be less than about 80,000, 60,000, 50,000 or 40,000 cP (e.g. 10,000-60,000, 10,000-50,000, or 20,000-40,000 cP). The total percentage of filled silicone and high viscosity silicone in the emulsion will usually be as follows:

filled silicone: greater than about 1%, 2%, 3%, 4%, 5%, or 6% and/or less than about 10%, 8%, 7%, 5% or 5%, by weight of the emulsion. In some embodiments the filled silicone is present in an amount of from 1% to 10%, or from about 2% to 8%, by weight of the emulsion.

high viscosity silicone: greater than about 10%, 15%, 20%, 25%, or 30%, and/or less than about 40%, 35%, 30%, 25%, or 20%, by weight of the emulsion. In some embodiments, the high viscosity silicone is present in an amount of from about 10% to about 40%, or 15% to 35%, by weight of the emulsion.

When the emulsion includes a high viscosity silicone, the emulsion will usually include silicone and silica in a weight ratio (silicone:silica) of about 4:1 or greater (including about 6:1 or greater, about 8:1 or greater, about 10:1 or greater, or about 15:1 or greater). As an upper limit, the weight ratio of silicone to total silica in the emulsion is usually about 35:1 or less (including about 30:1 or less, about 25:1 or less, or about 20:1 or less). In some embodiments, the weight ratio of silicone to silica in the emulsion is 4:1-30:1, 10:1-30:1, 4:1-25:1 or 10:1-25:1.

Additives

The emulsion can also comprise various additives to enhance the performance of the defoamer (including emulsion stability, defoaming ability). The emulsion can further comprise a drainage enhancer, for example, as disclosed in U.S. Pat. No. 5,152,925 to Furman. In some embodiments, the drainage enhancer comprises hydroxyalkyl (meth)acrylate containing polymers, which are then solubilized in an organic carrier system. The drainage enhancer is usually present in the emulsion, if at all, in an amount of from about 0% to about 10%, by weight of the emulsion.

The emulsion can further comprise a corrosion inhibitor. In some embodiments, the corrosion inhibitor is a salt. Exemplary corrosion inhibitors include, but are not limited to, sodium nitrite and sodium phosphate. In some embodiments, the corrosion inhibitor comprises an alkali metal nitrate, an alkali metal nitrite, an alkali metal silicate or cyanate or urea, or sodium mercaptobenzthiazole or benztriazole, or a combination thereof. In some embodiments, the alkali metal is sodium. In some embodiments, the alkali metal is potassium. In some embodiments, the alkali metal silicate includes compounds having the formula MO(SiO)n where M represents the alkali metal and n is greater than 1 (including from about 3 to about 3.3). In some embodiments, the corrosion inhibitor is sodium nitrite. The corrosion inhibitor is usually present in the emulsion, if at all, in an amount of from about 0% to about 2%, by weight of the emulsion.

The emulsion can further comprise a biocide. A biocide is an antimicrobial chemical substance that can deter, render harmless, or exert a controlling effect on any harmful organism. Examples of non-oxidizing biocides useful in the compositions of the present invention, particularly for use in the pulp and paper making processes, include, for instance, 2-bromo-2-nitropropane-1,3-diol, 5-chloro-2-methyl-4-isothiazolin-3-one, DBNPA, n-octyl-isothiazolin-3-one, MBT, quaternary ammonium compounds, THPS and glutaraldehyde. In one embodiment the biocide is selected from the group consisting of glutaraldehyde, 2,2-dibromo-3-nitrilopropionamide (DBNPA), 2-bromo-2-nitropropane-1,3-diol (Bronopol), 5-chloro-2-methyl-4-isothiazolin-3-one (CMIT), n-alkyl dimethyl benzyl ammonium chloride, didecyl dimethyl ammonium chloride (DDAC), alkenyl dimethylethyl ammonium chloride, tetrakis hydroxymethyl phosphonium sulfate (THPS). The biocide is usually present in the emulsion, if at all, in an amount of from about 0% to about 2%, by weight of the emulsion.

The emulsion can further comprise a surfactant (including an ionic surfactant or a nonionic surfactant), although not typically in an amount sufficient to stabilize the emulsion. Examples of ionic surfactants include cationic surfactants (for example, cetyltrimethyl-ammonium bromide (CTAB), hexadecyltrimethylammonium bromide (HTAB), dimethyldioctadecylammonium bromide (DDAB), and methylbenzethonium chloride (Hyamine™)) and anionic surfactants (for example, sodium dodecyl sulfate, sodium lauryl sulfate, lauryl dimethyl amine oxide, bile salts (such as sodium deoxycholate, sodium cholate)). Examples of nonionic surfactants include polysorbates (Tween™), polyethoxylated alcohols, polyoxyethylene sorbitan, octoxynol (Triton X100™), N,N-dimethyldodecyl-amine-N-oxide, Polyoxyl 10 lauryl ether, Brij 721™, nonylphenol ethoxylate (Tergitol™), cyclodextrins, lecithin, among others. A preferred non-ionic surfactant is Tween 20. An example ionic surfactant is a cationic surfactant, such as DDAB. Additional additives may also be included in the emulsion, including (but not limited to) buffering agents, acids, bases, salts, chaotropic agents, and the like. In some embodiments, the emulsion is substantially free of salt (including less than about 1% salt, less than about 0.5% salt, less than about 0.2% salt, by weight of the emulsion). In some of embodiments, the emulsion is free of salt (i.e., does not comprise salt). In some embodiments, the emulsion is substantially free of additives (including less than about 1% additives, less than about 0.5% additives, less than about 0.2% additives, by weight of the emulsion). In some of embodiments, the emulsion is free of additives (i.e., does not comprise additives).

In one particular embodiment the methods are carried out in the absence of a promoter such as KOH, and the compositions of the present invention lack a promoter such as KOH. In the methods of manufacturing of the present invention, the additives can be added in any sequence. Thus, any of the ingredients can be added to the aqueous phase, the silicon phase, or the finished emulsion, independently of one another.

Industrial Process Streams

The methods of the present invention can be practiced in any industrial process in which foaming is a concern, including process streams commonly encountered when processing or manufacturing wood pulp, paper, textiles, cement or paint, in addition to processes for treating industrial wastewater, food processing, and oil drilling. The methods can be used in practically any industrial water system where foaming is a problem, but are particularly well-adapted to recirculating water systems as found in papermaking systems, cooling water systems (including cooling towers, open and closed loop cooling units), industrial raw water systems, drinking water distribution systems, sanitizing drinking water system, oil production or recovery systems (oil field water system, drilling fluids), fuel storage system, metal working systems, heat exchangers, reactors, equipment used for storing and handling liquids, boilers and related steam generating units, radiators, flash evaporating units, refrigeration units, reverse osmosis equipment, gas scrubbing units, blast furnaces, sugar evaporating units, steam power plants, geothermal units, nuclear cooling units, water treatment units, pool recirculating units, mining circuits, closed loop heating units, machining fluids used in operations such as for example drilling, boring, milling, reaming, drawing, broaching, turning, cutting, sewing, grinding, thread cutting, shaping, spinning and rolling, hydraulic fluids, cooling fluids, and the like. In some embodiments, the industrial process stream is an industrial process stream in a cement-making process or a paint-making process.

In one embodiment the defoamer compositions and/or emulsions disclosed herein are added or dosed to a pulp and/or paper processing system. The composition can be generally utilized throughout the system to minimize and to prevent foam. In certain examples, the composition is added in a short loop of the system. Other examples of suitable addition points are large storage towers for process water (circulating water towers, filtrate water towers), clear or cloudy filtrate storage tanks, pulpers or process streams upstream/downstream of the pulpers, broke system or process streams upstream/downstream of vessels therein, wire pit process streams upstream/downstream of the pit, paper machine blend chest process streams upstream/downstream of the chest, fresh water tank, warm water tank and shower water tank. Suitable addition points for a pulp mill system include the digester, the brown stock stream, washers (such as the brown stock washer), the black liquor stream in a Kraft process, or the red or brown liquor in a sulfite process. The composition can be dosed continuously or periodically as a batch process. The composition can be fed for about 3 to about 45 minutes each about 6 to about 24 times a day, or for example for about 10 to about 30 minutes for about 12 to about 24 times a day.

Additional details about particular industrial processes are provided below for reference.

Paper-Making Processes

In the paper industry, the Kraft process is a frequently used alkaline pulping process. Spent chemicals in the process can be recycled and reused thus decreasing processing costs. A large disadvantage of this process is the occurrence of foam during the pulp screening and washing procedures.

The Kraft process first cooks the wood chips in digesters and then draws off the spent chemicals for reuse. The resulting pulp fibers are then washed free of a large amount of residual chemicals in brown stock washers. These washers are a series of vats usually three or four in number that alternatively dilute the pulp with water and thicken it by picking it up on large rotary screens. From the brown stock washers, the pulp travels to the screen room where it is again diluted with water and put through vibrating screens that accept the now completely delignified fibers and reject the clumps of unpulped fibers, knots, and other foreign material. Foam problems can be severe in the screen room, because the diluted pulp is subjected to violent agitation by the screens. The water removed from the pulp after the screening operations is referred to as the dilute black liquor and, for the sake of economy, is normally used as the dilution water for the third and fourth stage of the brown stock washers. The dilute black liquor is a foaming material, containing, for example, from about 0.001% to about 0.1% by weight of solids and having a pH of about 12. The foaming of the dilute black liquor increases along with the resin content of the wood used in this process.

Defoamers can be used in alkaline pulp mills during the screening operations so that a more efficient screening is accomplished and to prevent the pulp thickeners, used after the screening operations from becoming clogged with entrapped air. When water-dispersible defoamers are used during the screening operation, the control of foam and entrained air in the screening operation contributes to the washing efficiency of the pulp during the alkaline pulping process. This occurs because the screening efficiency of the pulp is increased, allowing ease of flow of the pulp throughout the thickeners and subsequent washers.

De-inking detergents used to de-ink paper in paper recycling operations can also cause significant defoaming problems. Detailed descriptions of such processes are found in standard textbooks, such as A. M. Schwartz and J. W. Perry, SURFACE ACTIVE AGENTS, Vol. I (1949); and SURFACE ACTIVE AGENTS AND DETERGENTS, Vol. II (1958), Interscience Publishers, New York, the descriptions of which are incorporated herein by reference.

The de-inking agents, in amounts ranging from about 0.3 to about 3 percent based on the weight of the paper, are used in solution in substantially aqueous media. The temperature of the de-inking solution can vary anywhere from room temperature, including about 40° F. to about 70° F. (about 4° C. to about 20° C.), up to about 200° F. (about 95° C.). The processes are generally performed at an alkaline pH (i.e. from about 7.0 and about 11.5). In general, the percent of cellulosic by weight of the aqueous de-inking solution should be below 10 percent and preferably below 6.0 percent, or between about 4.0 and 6.0 percent.

Following deinking treatment, the defibered material is dropped to a chest or other reservoir, after which it is diluted with water to a solids content of between about 0.5 and about 1.5 percent (including about 1.0 percent), based upon the solution weight. Following dilution, the pulp is separated from the solution and washed and thickened by well known methods. Optionally, the pulp is then acidified to a pH of between about 4 and about 6.5 (including about 4.5 to about 5.5), thickened and then formed into a web. The recovered stock can be blended with fresh virgin sulfate or sulfite stock, or with additional recovered stock to make cellulosic articles, such as newspaper and so forth. The de-foamer can be added during any of the foregoing stages to control or prevent foam formation.

Cement-Making Processes

The reliable administration of defoaming chemistries is also a key step in preventing excessive foaming and avoiding operational difficulties due to entrained air in cementing applications. Most chemical additives needed to make cement slurries are surface active molecules with an amphiphilic structure; on one hand soluble and on the other insoluble (or of limited solubility) in aqueous phase. This surfactancy is responsible for the stabilization of air-liquid interfaces and the potential generation of excessive foam and air. Such additives include cement retarders, dispersants, fluid loss control additives, gas migration control agents and ductility improvement additives. Chemicals used to enhance cement grinding are also known to cause foaming to some extent.

Origins of air in cement slurries include air already contained in the system and air entrapped during mixing. It is clearly a complex process, which is affected by many factors such as the mixing regime, physical and chemical properties of oil well cements, water ratio and quality, dosage and properties of the foaming agent, other chemical additives and supplementary cementitious materials (SCMs), and a range of other parameters. The defoamers of the present invention can be added at any time during the cement making sequence. They can be added to the water or the cement powder before the water and powder are mixed, or they can be added to the wet cement after the water and powder have been mixed.

Textile-Making Processes

Defoamers are also employed in textile wet processing during scouring, desizing, bleaching and dyeing operations. The scouring, desizing and bleaching operations used in textile processing to remove foreign materials such as warp size, processing oil, dirt and natural waxes from the fabric, often use detergents that create foam. These operations are performed before dying to ensure a well-prepared substrate that will accept dye evenly.

Traditional defoamers re-deposit insoluble materials on the fabrics during processing. If the insoluble materials are not removed before dyeing they can create resist spots in the fabrics where the dye does not penetrate or in the case of some synthetic fibers, oil spots where the fabric will actually dye darker in that spot. The defoamers of the present invention do not have this problem. They defoam during the higher temperature part of the process that employs the foaming surfactants and are subsequently rinsed out at a later stage in the process at lower temperatures.

Textile dyeing processes also employ surfactants that foam as wetting agents and after scour agents to remove loose dye stuff. Foam must be controlled during the dyeing process with materials that do not redeposit on the fabrics. The defoamer compositions disclosed herein also have application during the dyeing process where the actual dyeing will take place at a higher temperature employing the disclosed defoamers, and then the goods will subsequently be rinsed clean at a lower temperature.

EXAMPLES

The following examples are put forth so as to provide those of ordinary skill in the art with a complete disclosure and description of how the methods claimed herein are made and evaluated, and are intended to be purely exemplary of the invention and are not intended to limit the scope of what the inventor regards as his invention. Efforts have been made to ensure accuracy with respect to numbers (e.g., amounts, temperature, etc.) but some errors and deviations should be accounted for.

Example 1 Rheological Study

Viscosity and Density Measurements:

Viscosity measurements were performed with a Brookfield Viscometer (Model RVT) at room temperature. Densities were measure using the specific gravity cup test; measurements were done at room temperature.

Rheological Study:

A rheological study was performed to study the differences in viscosity of filled silicones (silica—silicone dispersion). The base silicone fluids used to prepare the filled silicone were Methyl Terminated (MT) and Hydroxyl Terminated (HT) silicone fluids of the same initial viscosity. The formulations described in Table 1 were all tested. All percentages in Table 1A are calculated as weight % from total sample weight.

TABLE 1A

Tested formulations

| Ingredient | Formulation A Homogenized at 90° C. | Formulation B | Formulation C Homogenized at 150° C. | Formulation D |
|---|---|---|---|---|
| 100 cst MT Silicone | 80% | — | 80% | — |
| 100 cst HT Silicone | — | 80% | — | 80% |
| Hydrophobic Silica (ZEOTHIX 166 from Huber Corporation) | 20% | 20% | 20% | 20% |

Formulations A and B were homogenized at 90° C. and formulations C and D were homogenized after being heated at 150° C. and returned to room temperature. Homogenization breaks up the silica agglomerates and disperses the silica particles in the continuous silicone phase. The homogenization can be done with a rotor stator or a Gaulin piston type homogenizer. All samples were stored at 25° C. for 24 hours after which viscosity and density was measured.

TABLE 1B

Viscosity data*

| Formulation | Viscosity at 90° C., cP | Completion viscosity at 25° C., cP |
|---|---|---|
| A | 4 550 | 6 900 |
| B | 330 | 1 650 |
| C | >5 000 | >10 000 |
| D | 4 325 | 1 300 |

*Viscosities were measured immediately after homogenization (90° C.) and after the filled silicones cooled to room temperature.

TABLE 1C

Density at 25° C.

| Formulation | Density, ppg | Density, g/ml |
|---|---|---|
| A | 8.88 | 1.07 |
| B | 8.96 | 1.08 |
| C | 8.80 | 1.06 |
| D | 8.96 | 1.08 |
| MT Silicone | 8.06 | 0.968 |
| HT Silicone | 8.14 | 0.977 |

Figure 1:
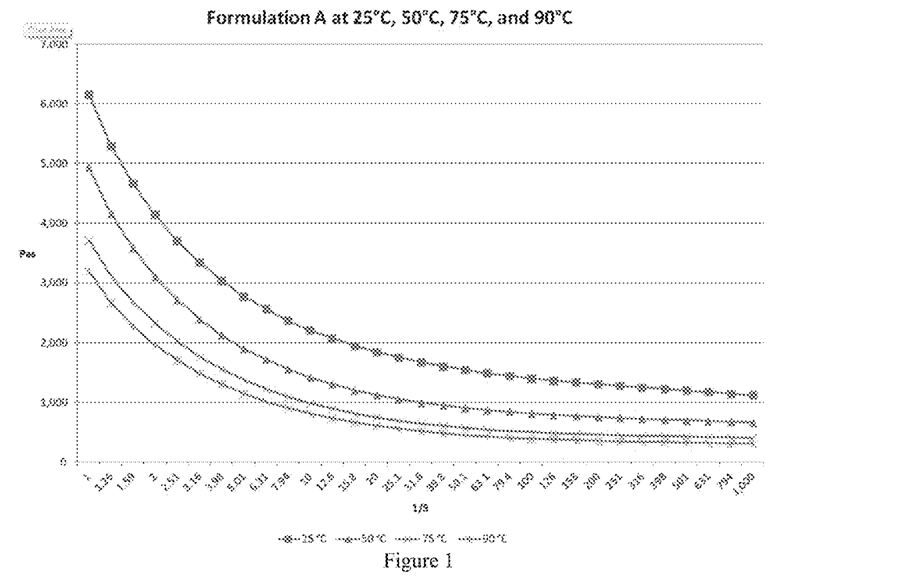
FIG. 1 is a graphical depiction of the rheological behavior of Formulation A, Example 1, plotting the viscosity (pascal second [Pa*s]) of the formulation on the y-axis versus the rate of shear on the x-axis (1/s), at different temperatures.
Figure 2:
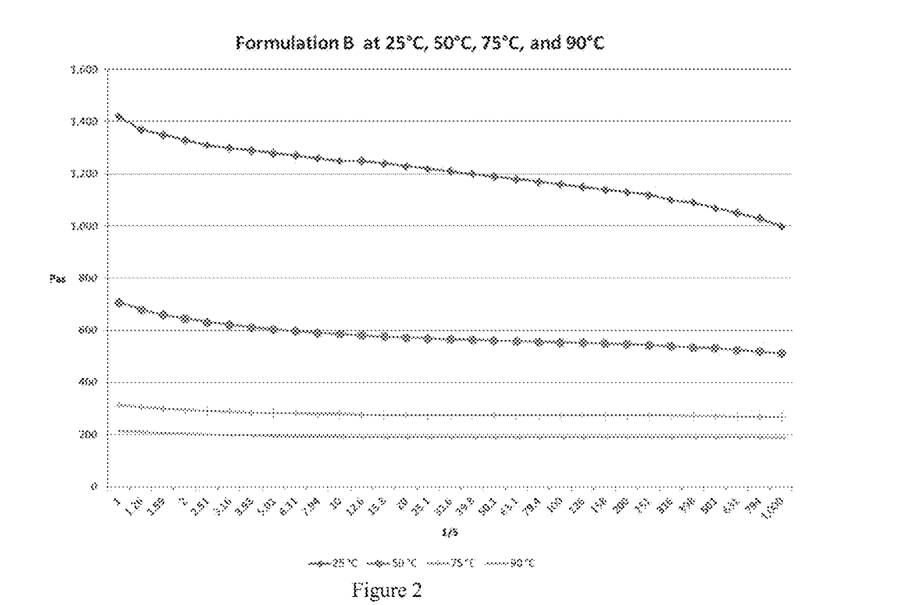
FIG. 2 is a graphical depiction of the rheological behavior of Formulation B, Example 1, plotting the viscosity (pascal second [Pa*s]) of the formulation on the y-axis versus the rate of shear on the x-axis (1/s), at different temperatures.
Figure 3:
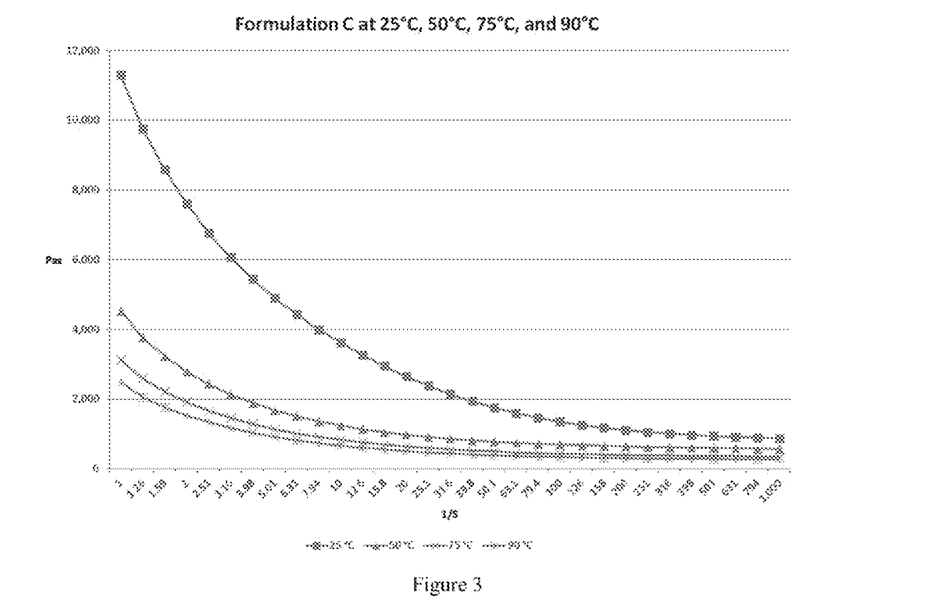
FIG. 3 is a graphical depiction of the rheological behavior of Formulation C, Example 1, plotting the viscosity (pascal second [Pa*s]) of the formulation on the y-axis versus the rate of shear on the x-axis (1/s), at different temperatures.
Figure 4:
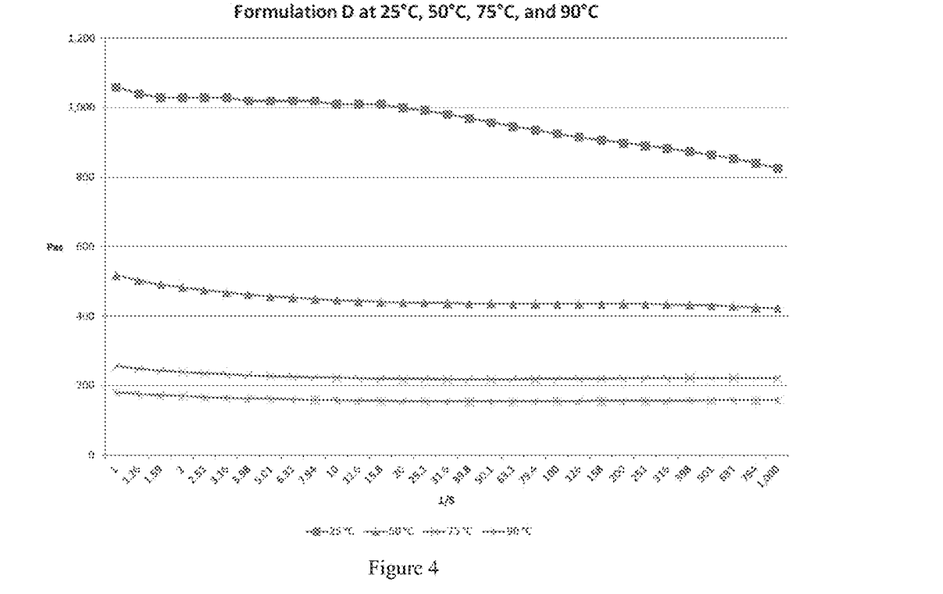
FIG. 4 is a graphical depiction of the rheological behavior of Formulation D, Example 1, plotting the viscosity (pascal second [Pa*s]) of the formulation on the y-axis versus the rate of shear on the x-axis (1/s), at different temperatures.
Figure 5:
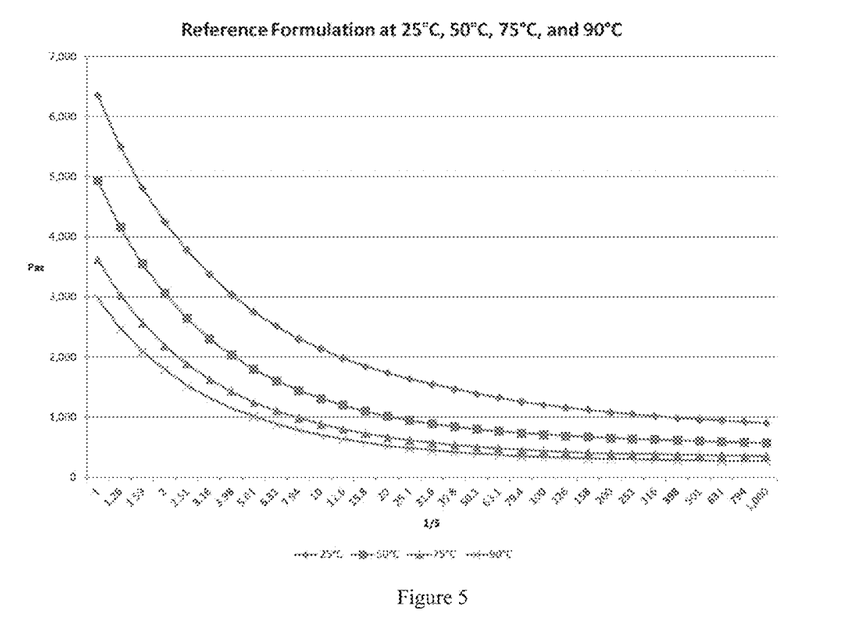
FIG. 5 is a graphical depiction of the rheological behavior of the Reference Formulation in Example 1, plotting the viscosity (pascal second [Pa*s]) of the formulation on the y-axis versus the rate of shear on the x-axis (1/s), at different temperatures.
Figure 6:
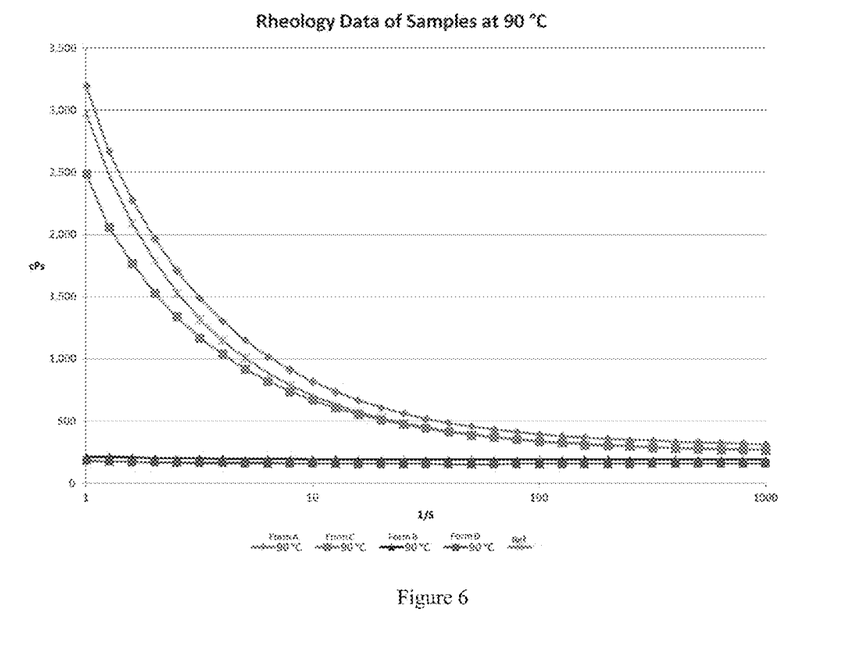
FIG. 6 compares the rheological behavior of all Formulations A-D and the Reference Formulation from Example 1 at 90° C., plotting the viscosity (cPs) on the y-axis and rate of shear (1/s) on the x-axis.

Rheometer Measurements:

Viscosity behavior of the formulations at constant temperatures (25° C., 50° C., 75° C. and 90° C.) were measured. A silica-silicone dispersion made of 18% hydrophobic silica and 82% s100 cst methyl terminated silicone fluid was used as a reference ("Reference Formulation"). The results are reported in FIGS. 1-6.

From the rheology data in FIGS. 1-6 it can be seen that hydroxyl terminated silicone dispersions have significantly lower viscosities compared to the methyl terminated silicone dispersions, even though the initial viscosity of the silicone materials was the same. The lower viscosity of the dispersion is a significant advantage from a production point of view, enabling faster feeding and processing of silica, at a greater final load.

Example 2 Evaluation of Samples by Feat Test

The Foam and Entrained Air Tester (FEAT) is a testing apparatus used to determine the efficacy of defoaming agents in a laboratory setting. The apparatus measures the change in density of the filtrate as a function of time as the defoaming agent is introduced to the apparatus. The change in density of the filtrate is a direct reflection of the change in entrained air. In pulp and paper mills, the presence of entrained air is undesirable because it can disturb sheet formation and drainage.

Defoamer formulation Y, which was the same as formulation B in table 1, was tested. Commercial defoaming agents Fennotech 6006 and 6016 (Kemira Oyj, Finland) were used as References. Results for the FEAT tests are shown in Table 2A.

TABLE 2A

| | Reference 1 (FT6006) | Reference 2 (FT6016) | Formulation Y |
|---|---|---|---|
| 0-30 seconds AUC | 4.57 | 4.47 | 4.34 |
| Total Runtime AUC | 21.42 | 22.17 | 23.09 |
| Percent Difference from Reference 1 Standard | | 3.52% | 7.81% |

It can be seen from Table 2A that the additive formulation according the present invention, Formulation Y, provides increased performance compared to commercial defoaming agents.

Example 3 FEAT Tests of Emulsions vs. FT6016 and FT6006

Performance of four new emulsions, described in Table 3A, were tested against commercial products FT6016 and FT6006 using the FEAT (Foam and Entrained Air Test) test.

TABLE 3A

Emulsions Tested

| | Filled Silicone Concentrates | | | |
|---|---|---|---|---|
| | C1 | C2 | C3 | C4 |
| Formulation Y, % | 16 | 25 | 69 | 31 |
| 30,000 Silicone Fluid, % | 84 | 75 | 31 | 69 |
| Silica in Concentrate, % | 3.20 | 5.00 | 6.20 | 7.80 |
| Silica in Emulsion, % | 0.82 | 1.29 | 1.59 | 2.00 |

Results for the FEAT Test Procedure for black liquor samples are reported in Table 3B.

TABLE 3B

Results for the FEAT Test Procedure for black liquor samples

| | $1^{st}$ 30 seconds AUC | Total Runtime AUC |
|---|---|---|
| Reference 1 (FT6006) | 0.92 | 0.98 |
| Reference 2 (FT6016) | 1 | 1 |
| C1 | 1.02 | 1.38 |
| C2 | 1.09 | 1.44 |
| C3 | 1.03 | 1.38 |
| C4 | 1.13 | 1.40 |

* Results are normalized based on the performance of FT6016

CONCLUSIONS

Defoamers FT6006 and 6016 are made with an expensive silicone concentrate having a complicated polymerization and cross-linking structure.

This new chemistry allows significantly better performance and yields a simpler product than Defoamers FT6006 and 6016.

The new chemistry also supports a simpler manufacturing process involving in-process homogenization of a filled silicone dispersion.

Throughout this application, various publications are referenced. The disclosures of these publications are hereby incorporated by reference in order to more fully describe the state of the art to which this invention pertains. It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a defoamer composition comprising silicone droplets emulsified in an aqueous phase, the method comprising:
   a) providing a silicone phase comprising a filled silicone made by:
      i) providing from about 75 weight parts to about 90 weight parts of a linear hydroxyl terminated siloxane having a neat viscosity at 25° C. of from about 10 cst to about 3000 cst; and
      ii) dispersing from about 10 weight parts to about 25 weight parts of silica in said siloxane to make a filled silicone;
   b) mixing said filled silicone ("FS") with a high viscosity dimethylsiloxane ("HVD") having a viscosity at 25° C. of from about 10,000 cst to about 100,000 cst at a weight ratio (HVD:FS) of from about 50:1 to about 5:1, preferably from about 30:1 to about 10:1,
   c) providing an aqueous phase; and
   d) emulsifying said silicone phase in said aqueous phase to form a silicone droplets in water emulsion.

2. The method of claim 1, wherein said dispersion step (ii) further comprises heating said siloxane to a temperature of from 90° C. to 160° C., and homogenizing said silica in said siloxane.

3. The method of claim 2, wherein said temperature is adequate to facilitate said dispersion of said silica in said siloxane, and to treat any exposed hydrophilic groups on said silica.

4. The method of claim 1, further comprising mixing one or more ingredients selected from a surfactant, a salt, and a biocide into said aqueous phase or said emulsion.

5. A method of defoaming or preventing foam in an industrial process stream comprising a step of adding to said industrial process stream an emulsion comprising silicone droplets in an aqueous phase, wherein:
   a) said silicone droplets comprise filled silicone comprising a silica in silanol dispersion,
   b) said filled silicone comprises silica to silanol at a weight ratio of from about 10:90 to about 25:75,
   c) said silanol is a linear hydroxyl terminated siloxane having a neat viscosity at 25° C. of from about 10 cst to about 3000 cst at 25° C.; and
   d) said silicone droplets further comprise a high viscosity dimethylsiloxane having a viscosity at 25° C. of from about 10,000 to about 100,000 cst, wherein said filled silicone ("FS") and said high viscosity dimethylsiloxane ("HVD") are present in said emulsion at a weight ratio (HVD:FS) of from about 50:1 to about 5:1.

6. The method of claim 5, wherein said filled silicone has a neat viscosity of from about 750 cP to about 5,000 cP at 25° C.

7. The method of claim 5, wherein said silanol has a neat viscosity at 25° C. of from about 75 to about 3000 cst.

8. The method of claim 5, wherein said emulsion comprises from about 0.5 to about 10 weight percent of said filled silicone.

9. The method of claim 5, wherein said emulsion further comprises one or more ingredients selected from a drainage agent, a surfactant, a salt, and a biocide.

10. The method of claim 5, wherein said silica in said filled silicone is a hydrophobic silica having a median particle size of from about 30 to about 1 microns.

11. The method of claim 5, wherein said industrial process stream is a stream in a process for manufacturing pulp, paper, cement, or textiles.

12. A defoamer composition comprising silicone droplets emulsified in an aqueous phase, wherein:
  a) said silicone droplets comprise a filled silicone;
  b) said filled silicone includes from about 75 weight parts to about 90 weight parts of a silanol and from about 10 weight parts to about 25 weight parts of silica dispersed in said silanol,
  c) said silanol is a linear hydroxyl terminated siloxane having a neat viscosity at 25° C. of from about 10 cst to about 3000 cst; and
  d) said silicone droplets further comprise a high viscosity dimethylsiloxane having a viscosity at 25° C. of from about 10,000 to about 100,000 cst, wherein said filled silicone ("FS") and said high viscosity dimethylsiloxane ("HVD") are present in said emulsion at a weight ratio (HVD:FS) of from about 50:1 to about 5:1.

13. The defoamer composition of claim 12, wherein said silica in said filled silicone is a hydrophobic silica having a median particle size of from about 30 to about 1 microns.

14. The defoamer composition of claim 12, further comprising one or more ingredients selected from a surfactant, a salt, and a biocide.

\* \* \* \* \*